(12) United States Patent
Choi et al.

(10) Patent No.: US 9,324,509 B2
(45) Date of Patent: Apr. 26, 2016

(54) TOUCH PANEL

(71) Applicant: LG INNOTEK CO., LTD., Seoul (KR)

(72) Inventors: Doo Sun Choi, Seoul (KR); Hyun Min Nah, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 201 days.

(21) Appl. No.: 13/907,113

(22) Filed: May 31, 2013

(65) Prior Publication Data
US 2014/0001017 A1    Jan. 2, 2014

(30) Foreign Application Priority Data

Jun. 29, 2012   (KR) ........................ 10-2012-0070872

(51) Int. Cl.
*H01H 1/06*   (2006.01)
*G06F 3/044*   (2006.01)

(52) U.S. Cl.
CPC ................. *H01H 1/06* (2013.01); *G06F 3/044* (2013.01); *G06F 2203/04103* (2013.01); *G06F 2203/04111* (2013.01)

(58) Field of Classification Search
CPC ......... G06F 3/041; G06F 3/044; G06F 3/045; G06F 3/0412; G06F 3/0416; G06F 3/042; G06F 3/046; G06F 3/047; G06F 3/0414; G06F 3/0418; H01H 1/06
USPC .............................. 324/658; 345/173, 174, 87
See application file for complete search history.

(56) References Cited

U.S. PATENT DOCUMENTS

| | | | |
|---|---|---|---|
| 7,724,241 B2 * | 5/2010 | Fukui et al. | 345/173 |
| 2006/0132461 A1 * | 6/2006 | Furukawa | H01L 27/3274 345/173 |
| 2007/0279378 A1 * | 12/2007 | Takeuchi | B82Y 20/00 345/107 |
| 2008/0018611 A1 * | 1/2008 | Serban | G06F 3/0416 345/173 |
| 2010/0093247 A1 * | 4/2010 | Jiang et al. | 445/24 |
| 2010/0141608 A1 * | 6/2010 | Huang et al. | 345/178 |
| 2010/0265193 A1 * | 10/2010 | Kung et al. | 345/173 |
| 2011/0032196 A1 * | 2/2011 | Feng et al. | 345/173 |
| 2011/0057897 A1 * | 3/2011 | Wang et al. | 345/173 |
| 2011/0273395 A1 * | 11/2011 | Chung, II | 345/174 |
| 2011/0291966 A1 * | 12/2011 | Takao et al. | 345/173 |
| 2012/0098788 A1 * | 4/2012 | Sekiguchi | 345/174 |
| 2012/0154334 A1 * | 6/2012 | Furuhashi et al. | 345/174 |
| 2012/0313887 A1 * | 12/2012 | Chen et al. | 345/174 |

* cited by examiner

*Primary Examiner* — Tung X Nguyen
*Assistant Examiner* — David Frederiksen
(74) *Attorney, Agent, or Firm* — Saliwanchik Lloyd & Eisenschenk

(57) ABSTRACT

Disclosed is a touch panel. The touch panel includes an insulating layer, first sensing electrode patterns provided on one surface of the insulating layer, and second sensing electrode patterns provided on another surface opposite to the one surface of the insulating layer such that the second sensing electrode patterns are insulated from the first sensing electrode patterns. A bridge electrode is prevented from being viewed by the eyes of a user by removing the bridge electrode from the touch panel. The touch panel is constructed in a simpler structure, so that the production cost of the touch panel is reduced.

13 Claims, 1 Drawing Sheet

TOUCH PANEL

CROSS-REFERENCE TO RELATED APPLICATION

This application claims the benefit under 35 U.S.C. §119 of Korean Patent Application No. 10-2012-0070872, filed Jun. 29, 2012, which is hereby incorporated by reference in its entirety.

BACKGROUND

The embodiment relates to a touch panel. In more particular, the embodiment relates to a touch panel capable of preventing a bridge from being viewed by the eyes of a user.

A touch panel including an input unit (pointing device) has been extensively used in displays of electronic devices such as personal digital assistants (PDA), a laptop computer, an office automation (OA) device, a medical device, and an automobile navigation system. For example, a capacitive touch panel, a resistive touch panel, an electromagnetic induction touch panel, and an optical touch panel are generally known as representative touch panels to those skilled in the art. Among them, the capacitive touch panel has been most expensively used.

FIG. 1 is a sectional view showing an electrode pattern of a touch panel according to the related art. Hereinafter, the capacitive touch panel according to the related art will be described with reference to FIG. 1.

As shown in FIG. 1, according to the touch panel of the related art, after forming first and second sensing electrode patterns 120 and 130 on a substrate 110, and forming an insulating pattern 140 by using an insulating material, a bridge electrode 150 is formed on the insulating pattern 140 to electrically connect the first sensing electrode patterns 120, which are spaced apart from each other, with each other.

However, according to the touch panel of the related art, the bridge electrode 150 connecting the first sensing electrode patterns 120 with each other is viewed by the naked eyes of the user. Accordingly, attempts on various modifications of the touch panel have been made by reducing the width of the bridge electrode 150 or changing the shape of the bridge electrode 150. However, the fundamental problem in which the bridge electrode 150 is viewed by the naked eyes of the user is not overcome.

BRIEF SUMMARY

The embodiment provides a touch panel, in which a bridge electrode can be from being viewed by the eyes of a user by removing the bridge electrode of the touch panel, and the production cost of the touch panel can be reduced by constructing the touch panel in a simpler structure.

According to the embodiment, there is provided a touch panel including an insulating layer, first sensing electrode patterns provided on one surface of the insulating layer, and second sensing electrode patterns provided on another surface opposite to the one surface of the insulating layer such that the second sensing electrode patterns are insulated from the first sensing electrode patterns.

As described above, according to the embodiment, the bridge electrode can be prevented from being viewed by the eyes of a user by removing the bridge electrode from the touch panel. The production cost of the touch panel can be reduced by constructing the touch panel in a simpler structure.

DETAILED DESCRIPTION

Figure 1:
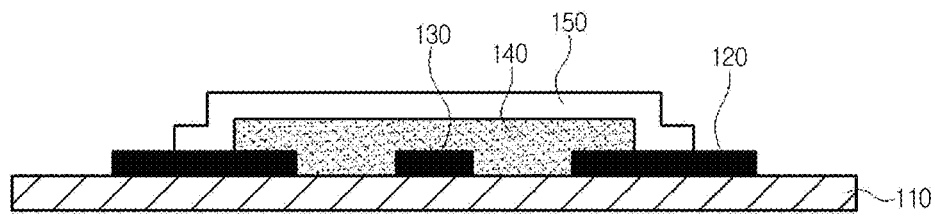
FIG. 1 is a sectional view showing an electrode pattern of a touch panel according to the related art.

Hereinafter, embodiments will be described in detail with reference to accompanying drawings. In the following description, when detailed description about well-known functions or configurations may make the subject matter of the disclosure unclear, the detailed description will be omitted. In addition, the size of the elements shown in the drawings may be exaggerated for the purpose of explanation and may not utterly reflect the actual size.

Figure 2:
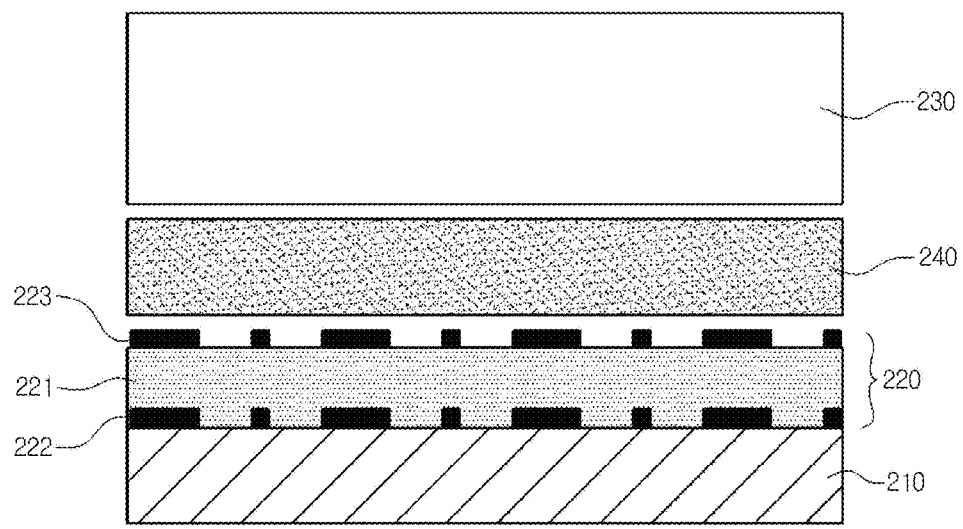
FIG. 2 is a sectional view showing a touch panel according to one embodiment.

FIG. 2 is a sectional view showing a touch panel according to one embodiment.

Hereinafter, the touch panel according to one embodiment will be described with reference to FIG. 2.

According to the touch panel of one embodiment, as shown in FIG. 2, a sensing electrode layer 220 is formed on a substrate 210 while being located on one surface of a transparent window 230.

The sensing electrode layer 220 includes an insulating layer 221, first sensing electrode patterns 222, and second sensing electrode patterns 223. In more detail, the sensing electrode layer 220 includes the insulating layer 221, the first sensing electrode patterns 222 formed on one surface of the insulating layer 221, and the second sensing electrode patterns 223 formed on another surface provided in opposition to the one surface of the insulating layer 221.

Hereinafter, the stacking sequence of the above layers of the touch panel will be described with reference to FIG. 2. The first sensing electrode patterns 222 of the sensing electrode layer 220 are formed on the substrate 210 while directly making contact with the substrate 210, and the insulating layer 221 covers a top surface and a lateral side of the first sensing electrode patterns 222.

The second sensing electrode patterns 223 are formed on an upper portion of the insulating layer 221. In other words, the second and first sensing electrode patterns 223 and 222 are spaced apart from each other while being insulated from each other.

In addition, as shown in FIG. 2, the first sensing electrode patterns 222 are inserted into the insulating layer 221 when viewed from the substrate 210 provided at a lower portion of the sensing electrode layer 220. The second sensing electrode patterns 223 may protrude from the surface of the insulating layer 221. In addition, although not shown, the first sensing electrode patterns 222 may protrude from the surface of the insulating layer 221, and the second sensing electrode patterns 223 may be inserted into the insulating layer 221. Alternately, both of the first and second sensing electrode patterns 222 and 223 may be inserted into the insulating layer 221. In addition, both of the first and second sensing electrode patterns 222 and 223 may protrude from the surface of the insulating layer 221.

In addition, the substrate 210 includes at least one of polyethylene terephthalate resin (PET), polycarbonate (PC), polymethyl methacrylate (PMMA), triacetate cellulose (TAC), and polyether sulfone (PES). The insulating layer 221 includes silicon dioxide ($SiO_2$).

The transparent window 230 is formed on the sensing electrode layer 220 described above. In this case, the sensing electrode layer 220 is attached to the transparent window 230 through an OCA layer 240. In detail, the second sensing electrode patterns 223 are attached to the transparent window 230 through the OCA layer 240. The transparent window 230 includes at least one of tempered glass, semi-tempered glass, soda-lime glass, and reinforced plastic.

In other words, as shown in FIG. 2, if the touch panel is formed by forming the first and second sensing electrode patterns 222 and 223 at both sides of the insulating layer 221, the touch panel having the simpler structure can be formed without an additional bridge electrode.

Figure 3:
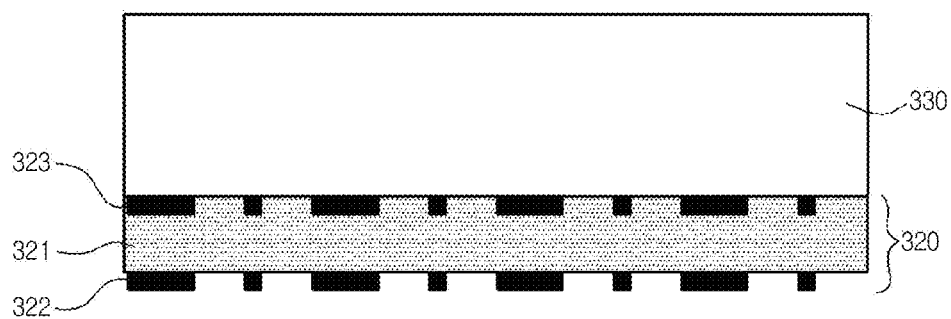
FIG. 3 is a sectional view showing a touch panel according to another embodiment.

FIG. 3 is a sectional view showing a touch panel according to another embodiment.

Hereinafter, the touch panel according to another embodiment will be described with reference to FIG. 3.

According to the touch panel of another embodiment, as shown in FIG. 3, a sensing electrode layer 320 is formed on one surface of a transparent window 330.

In more detail, the sensing electrode layer 320 includes an insulating layer 321, first sensing electrode patterns 323, and second sensing electrode patterns 322. In other words, the sensing electrode layer 320 includes the insulating layer 321, the first sensing electrode patterns 323 on one surface of the insulating layer 321, and the second sensing electrode patterns 322 on another surface in opposition to the one surface of the insulating layer 321.

Hereinafter, the stacking sequence of the above layers of the touch panel will be described with reference to FIG. 3. The first sensing electrode patterns 323 of the sensing electrode layer 320 are directly formed on the transparent window 33, and the insulating layer 321 covers the first sensing electrode patterns 323. The second sensing electrode patterns 322 are located on the insulating layer 321.

In this case, as shown in FIG. 3, when viewed from the transparent window 330 provided at an upper portion of the sensing electrode layer 320, the first sensing electrode patterns 323 may be inserted into the insulating layer 321, and the second sensing electrode patterns 322 may protrude from the surface of the insulating layer 321. In addition, although not shown, the first sensing electrode patterns 323 may protrude from the surface of the insulating layer 321, and the second sensing electrode patterns 322 may be inserted into the insulating layer 321. In addition, both of the first and second sensing electrode patterns 323 and 322 may be inserted into the insulating layer 321. Alternately, both of the first and second sensing electrode patterns 323 and 322 may protrude from the surface of the insulating layer 321.

In addition, similarly to the embodiment of FIG. 3, the insulating layer 321 includes silicon dioxide ($SiO_2$). The transparent window 330 includes at least one of tempered glass, semi-tempered glass, soda-lime glass, and reinforced plastic.

In addition, although not shown, when the sensing electrode layer 320 is formed on the transparent window 330, the sensing electrode layer 320 is attached to the transparent window 330 by an OCA layer (not shown). In detail, the first sensing electrode patterns 323 are attached to the transparent window 330 by the OCA layer.

Therefore, according to the embodiment, a touch panel having a simpler structure is formed without an additional bridge electrode, so that the production cost of the touch panel can be reduced, and the bridge electrode can be prevented from being viewed through the eyes of the user.

As described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects.

What is claimed is:

1. A touch panel comprising:
   an insulating layer;
   first sensing electrode patterns disposed on one surface of the insulating layer; and
   second sensing electrode patterns disposed on another surface of the insulating layer opposite to the one surface of the insulating layer such that the second sensing electrode patterns are insulated from the first sensing electrode patterns;
   wherein the insulating layer covers a top surface and a lateral side of the first sensing electrode patterns;
   wherein a bottom surface of the second sensing electrode patterns is in direct contact with the another surface of the insulating layer;
   wherein positions of the first sensing electrode patterns and positions of the second sensing electrode patterns correspond to each other, respectively;
   wherein line widths of the first sensing electrode patterns and line widths of the second sensing electrode patterns correspond to each other, respectively; and
   wherein the first sense electrode patterns and the second sense electrode patterns each comprises a pattern unit arranged repeatedly, wherein the pattern unit comprises patterns having different line widths.

2. The touch panel of claim 1, further comprising a transparent window disposed on the second sensing electrode patterns.

3. The touch panel of claim 2, further comprising a substrate disposed in opposition to the transparent window and having the first sensing electrode patterns directly disposed on the substrate.

4. The touch panel of claim 3, wherein the first sensing electrode patterns, the insulating layer, the second sensing electrode patterns, and the transparent window are sequentially stacked on the substrate.

5. The touch panel of claim 3, wherein the substrate includes at least one of polyethylene terephthalate resin (PET), polycarbonate (PC), polymethyl methacrylate (PMMA), triacetate cellulose (TAC), and polyether sulfone (PES).

6. The touch panel of claim 2, further comprising an OCA layer for attaching the second sensing electrode patterns onto the transparent window.

7. The touch panel of claim 2, wherein the transparent window includes at least one of tempered glass, semi-tempered glass, soda-lime glass, and reinforced plastic.

8. The touch panel of claim 1, further comprising a transparent window having the first sensing electrode patterns directly disposed on the transparent window.

9. The touch panel of claim 8, wherein the first sensing electrode patterns, the insulating layer, and the second sensing electrode patterns are sequentially stacked on the transparent window.

10. The touch panel of claim 8, further comprising an OCA layer for attaching the first sensing electrode patterns to the transparent window.

11. The touch panel of claim 8, wherein the transparent window includes at least one of tempered glass, semi-tempered glass, soda-lime glass, and reinforced plastic.

12. The touch panel of claim 1, wherein the first sensing electrode patterns are inserted into the insulating layer; and
    wherein the second sensing electrode patterns protrude from the another surface of the insulating layer.

13. The touch panel of claim 1, wherein the insulating layer includes silicon dioxide ($SiO_2$).

\* \* \* \* \*